US006953897B2

(12) United States Patent
Marroquin et al.

(10) Patent No.: US 6,953,897 B2
(45) Date of Patent: Oct. 11, 2005

(54) DEVICE AND METHOD FOR CLAMPING AND GROUNDING A CABLE

(75) Inventors: Christopher Michael Marroquin, Rochester, MN (US); Mark James Jeanson, Rochester, MN (US); Don Alan Gilliland, Rochester, MN (US); Christopher Lee Tuma, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 10/645,741

(22) Filed: Aug. 21, 2003

(65) Prior Publication Data

US 2005/0039941 A1 Feb. 24, 2005

(51) Int. Cl.[7] ........................ H02G 15/06
(52) U.S. Cl. ........................ 174/75 C; 174/78
(58) Field of Search ........................ 174/74 R, 77 R, 174/78, 84 R, 88 R, 88 C, 88 S, 90, 94 R, 75 C

(56) References Cited

U.S. PATENT DOCUMENTS

| | | | | |
|---|---|---|---|---|
| 4,201,433 A | * 5/1980 | Caldwell | 439/98 |
| 5,038,001 A | * 8/1991 | Koegel et al. | 174/112 |
| 5,122,068 A | * 6/1992 | Koss | 439/98 |
| 5,281,762 A | * 1/1994 | Long et al. | 174/78 |
| 5,313,019 A | * 5/1994 | Brusselmans et al. | 174/93 |
| 5,567,916 A | * 10/1996 | Napiorkowski et al. | 174/153 G |
| 5,713,748 A | * 2/1998 | Mulvihill | 439/98 |
| 5,794,897 A | * 8/1998 | Jobin et al. | 248/74.4 |
| 6,031,185 A | * 2/2000 | Bouveret et al. | 174/84 R |
| 6,118,076 A | * 9/2000 | Damm et al. | 174/77 R |
| 6,194,659 B1 | * 2/2001 | Cornu | 174/65 R |
| 6,297,447 B1 | * 10/2001 | Burnett et al. | 174/40 CC |
| 6,545,220 B2 | * 4/2003 | Syed et al. | 174/75 C |

* cited by examiner

*Primary Examiner*—William H. Mayo, III
(74) *Attorney, Agent, or Firm*—Rabin & Berdo; Robert H. Berdo, Jr.

(57) ABSTRACT

A device and method for clamping and grounding a cable, includes a conductive cable clamp. The clamp is adapted to clamp and conductively engage a periphery of a conductive shield of the cable. In one aspect of the invention, the cable clamp includes a first conductive plate and a second conductive plate. Each of the plates has at least one groove formed therein. The first plate is positionable against the second plate so that the groove in the first plate and the groove in the second plate collectively form a hole extending from one edge of the cable clamp to an opposite edge of the cable clamp, with the hole accommodating the cable therein. In another aspect of the invention, the cable clamp includes a conductive flexible fabric having at least one pattern formed therein, with the pattern accommodating the cable therein.

25 Claims, 9 Drawing Sheets

DEVICE AND METHOD FOR CLAMPING AND GROUNDING A CABLE

BACKGROUND OF THE INVENTION

1. Field of the Invention

The present invention relates to a device and method for clamping and grounding a cable, and in particular, to a device and method that clamps a periphery of the cable to ground the cable to a frame through which the cable passes, to prevent electromagnetic radiation leakage.

2. Background Information

Computer systems may include a number of interconnected subsystems. A typical subsystem may include a system frame containing a system processor, for example, and/or other electrical components, such as printed circuit boards, that are electrically coupled to associated electrical components disposed in other subsystems.

Electrical cables, such as coaxial cables, may be used to electrically couple the respective electrical components of the various subsystems. For example, the electrical cables typically will have an internal conductive (signal) wire that allows electrical signals, for example, to be transmitted from one printed circuit board to another printed circuit board. This allows various electrical components on the one printed circuit board to communicate with electrical components on the other printed circuit board. Cables are also used to transmit power to and from the various electrical components.

Many of the electrical components inside the respective subsystems, when operated, will generate emissions that include electromagnetic radiation. This electromagnetic radiation may travel through the air, and be received by the electrical components of the other subsystems, and/or by the signal wires of the cable. The received electromagnetic radiation may then adversely affect the operation of the various electrical components (to which the cable may or may not be connected), causing the computer system to malfunction. When this electromagnetic radiation adversely influences the proper functioning of the electrical components, the result is known as electromagnetic interference (also known as EMI). Thus, in order to ensure reliable operation, cables have been developed in which the signal wire or wires within the cable are shielded against outside interference. For example, it is known to wrap or encircle all of the signal wires in a cable by a conducting shield, usually a conductive foil surrounded by a conductive braided wire. Typically, the conducting shield is covered with an outer insulating sheathing (cover), and is connected to an external jacket, such as a metal housing shield of a plug, at each end of the cable. The metal housing shield is then coupled to a ground potential, so that any electromagnetic radiation is conducted to the ground potential, thereby preventing the radiation from being received by the signal wires and adversely affecting the electrical components coupled to the cable.

However, while the above approach will effectively shield the signal wires of the cable, unless adequately protected, the various electrical components of one subsystem may still be affected by the electromagnetic radiation emitted from another subsystem. Thus, it is also conventional to provide an EMI shield around each respective subsystem, so that the electromagnetic radiation emitted from an electrical component in one subsystem will not adversely affect the electrical components in the other subsystems. This can conventionally be accomplished by completely enclosing each subsystem with a conductive frame that is coupled to a ground potential, so that any electromagnetic radiation is conducted, via the frame, to the ground potential. In order to prevent electromagnetic radiation from leaking from the subsystem, it is also conventional to overlap adjoining edges of the conductive frame, and/or to provide a conductive compressive gasket in seams formed between the adjoining edges of the frame.

However, as will be appreciated, the cable or cables that are used to couple the electrical components of one subsystem with the electrical components of the other subsystems must pass through the frames of the respective subsystems. This could be accomplished simply by forming an opening in the sides of the respective frames, and extending the cables through the openings. However, electromagnetic radiation may also pass through the openings. As such, this approach is not satisfactory when complete sealing of the respective subsystems against electromagnetic radiation leakage is desired.

It is thus also conventional to provide cable connectors that are attached and grounded to the sides of the respective frame. Each cable connector may have opposing cable ports, with one of the ports (the inside port) being accessible from inside the subsystem frame, and with the other port (the outside port) being accessible from outside the subsystem frame. Each port includes an external conductive jacket that is coupled to earth ground and that can be coupled to the shield of the cable, and an inner connector that can be coupled to the signal wires of the cable. Using this approach, a first cable is used to connect an associated electrical component to the inside port, and a second cable is used to connect the outside port of the connector to an outside port of another connector disposed on another subsystem frame.

However, cable connectors are relatively expensive. As such, this approach may cause an unacceptable increase in the overall cost of the system. Moreover, since the cables will need to be individually connected, using cable connectors will increase the time required to assemble a system, which again may cause an unacceptable increase in the overall cost of the system. Thus, there is a need for an arrangement that will allow a cable to connect the electrical components of one subsystem with the electrical components of another subsystem without the use of conventional cable connectors at the subsystem boundaries.

Additionally, the numerous cable connections that are required significantly increase the likelihood that a connection will fail, thus reducing the reliability of the resulting system. Thus, there is a need for a way to allow a cable to reliably connect the electrical components of one subsystem with the electrical components of another subsystem.

Further, with larger and more complex systems, it is typical to require numerous, for example, 10, 20 or 30 or more, cables per subsystem. With a large number of cables, it may be impossible to provide a large enough surface area on the frame that could accommodate the necessary number of cable connectors.

Thus, there is a need for an arrangement that will easily accommodate multiple cables to connect the electrical components of one subsystem with the electrical components of other subsystems.

SUMMARY OF THE INVENTION

It is, therefore, a principal object of this invention to provide a device and method for clamping and grounding a cable.

It is another object of the invention to provide a device and method for clamping and grounding a cable that solves the above-mentioned problems.

These and other objects of the present invention are accomplished by the device and method for clamping and grounding a cable disclosed herein.

According to one aspect of the invention, a conductive cable clamp is provided. In a first exemplary aspect of the invention, the conductive cable clamp includes at least a first conductive, rigid plate and a second conductive, rigid plate disposed in a superposed relationship. Each plate has opposing major surfaces, with at least one of the major surfaces having at least one semicircular groove formed therein. In a further aspect of the invention, the at least one major surface of each plate has a plurality of the grooves formed therein, with the grooves being parallel to each other. Each groove extends from one edge of the plate to an opposite edge of the plate.

The plates are positionable superposed and adjacent to each other, so that the major surfaces abut against each other. The grooves of one plate are then positioned to mirror the grooves of an abutting plate, so that the respective grooves collectively form a cylindrical hole or holes. Each hole will accommodate a respective cable.

In another aspect of the invention, the plates are essentially rectangular, and have four contiguous substantially flat edge faces, i.e., a top, a bottom and two opposing sides. The edge faces separate the major surfaces from each other. Moreover, one of the major surfaces of at least one of the plates is substantially flat, i.e., free of grooves. This configuration allows the flat major surface and edge faces to be easily sealed against an abutting surface of a system frame, or against further plates, in a manner that will be more fully described in the paragraphs that follow.

In another aspect of the invention, the abutting major surfaces of the plates are joined together. For example, the plates can be fixed together using an adhesive, such as an epoxy resin, for example. Alternatively, the plates can be fused together, or joined using mechanical fasteners, for example.

In another exemplary aspect of the invention, the cable clamp can include a plurality of superposed sub-clamps. In this aspect of the invention, two superposed sub-clamps can be formed using only three plates, i.e., two outermost plates and an intermediate plate. The outermost plates may be configured as discussed above. Further, each major surfaces of the intermediate plate has at least one of the semicircular grooves formed therein. In this aspect of the invention, the intermediate plate will form one of the plates of a first sub-clamp, and will likewise form one of the plates of a second, superposed sub-clamp. This configuration is advantageous, since only three plates are required for forming two sub-clamps; hence, less space is required. As will be appreciated, the concepts of this aspect of the invention can be expanded so that more that one intermediate plate may be provided. For example, three superposed sub-clamps can be formed using only four plates, i.e., two intermediate plates, and two outermost plates.

In an exemplary aspect of the invention, a portion of the outer insulating sheathing of the cable is stripped from the cable, to expose an underlying conductive shield. In a preferred aspect of the invention, the grooves formed in the respective plates have a radius that is about, or slightly less than, ½ of a diameter of the stripped portion of the cable.

In use, the stripped portion of the respective cable is placed in a respective groove of one of the plates. Another plate is then disposed over the cable and the one plate, and is subsequently fastened to the one plate. As a result, the stripped portion of the cable will be disposed inside of the through hole formed in the resulting cable clamp. Moreover, if the diameter of the through hole is sized to be slightly less than a diameter of the stripped portion of a respective cable, the cable clamp will squeeze the cable. Thus, the cable clamp, once it is fastened to the system fame, will serve to securely hold the cable in position. Moreover, this will ensure that the underlying conductive shield of the cable will be contacted around its entire circumference by the conductive cable clamp, thus also ensuring that electromagnetic radiation will be prevented from leaking past the stripped portion of the cable.

In a further aspect of the invention, the stripped portion of the respective cable may be bonded within the respective through hole using a conductive adhesive. This can help to provide a more secure connection between the cable and the cable clamp.

In another aspect of the invention, each cable clamp may be sized in length to fit within, and essentially fill, an associated opening formed in the system frame. Alternatively, the cable clamp may have a length that is substantially less than the associated opening formed in the system frame. In this scenario, plural ones of the cable clamps may be placed side-by-side, until the cable clamps essentially fill the opening. Any remaining gaps may then be filled using a conductive gasket, for example. By providing smaller, plural cable clamps, a standard-sized cable clamp could advantageously be utilized with various sized openings.

The cable clamps may be held in place against the system frame by press fitting the cable clamps into the opening, or by frictionally retaining the cable clamps in the opening using a conductive gasket. Alternatively, or in conjunction with the above, the cable clamps can be fastened to the system frame using an adhesive, using welding techniques, or by using mechanical fasteners, such as screws or auxiliary clamps (not shown).

In another exemplary aspect of the invention, instead of two rigid, conductive plates, the cable clamp may include a conductive flexible fabric that is adhered to an underlying layer of foam, which may or may not be conductive. In this exemplary aspect of the invention, the conductive fabric and foam combination (hereinafter referred to as simply a fabric) has one star pattern formed therein for each cable that is to be accommodated.

Each star pattern is formed of a plurality of slits, each of which extends radially outward from a center of the star pattern. The slits form a plurality of triangular flaps, with one flap being disposed between two adjacent slits, and with the apexes of the flaps terminating at the center of the star pattern.

In use, the stripped portion of a respective cable is placed in one of the star patterns. The cable will cause the flaps to flex outwardly, and to lie on the underlying conductive shield of the cable. Since the fabric is conductive, the underlying conductive shield will be grounded to the system frame via the fabric. Moreover, the plurality of flaps will substantially surround the stripped portion of the cable, so that most of the outer circumference of the stripped portion will be in contact with a respective flap.

Most of the slits of any one star pattern will terminate a short distance away from the center of the star pattern. However, in a further aspect of the invention, one of the slits of each star pattern may be longer than the other slits, and extends to the edge of the fabric. This configuration will allow a cable to be easily inserted into, and removed from, the fabric, as desired.

In order to provide sufficient rigidity to the fabric, the cable clamp may include two rigid conductive plates, one of which is disposed over the fabric, and the other of which is disposed below the fabric. The plates have semicircular recesses formed along one of their respective edges. Each recess is positioned to correspond to a respective star pattern. When assembled, the long slit of each star pattern will be positioned approximately central to the corresponding recess. The recesses thus allow the star patterns to be accessed by the cable.

One of the plates may have a rear flange, which serves as a positioning member for the other plate and the fabric. That is, a rear edge of the other plate will abut against the flange when properly positioned, thus ensuring that the semicircular recesses in both plates will be aligned relative to each other, from a front-to-back direction of the plates. Similarly, the rear edge of the fabric will also abut against the flange when properly positioned, thus ensuring that the star patterns are aligned relative to the semicircular recesses in the plates, from a front-to-back direction of the plates.

The plates may be connected together in a variety of known manners. For example, the ends of the plates may be riveted together. When the plates are connected together, the fabric will be securely clamped between the plates, ensuring the fabric will not move from between the plates.

In a further aspect of the invention, the fabric has a width, as measured from the front-to-back direction, which is greater than a width of the flangeless plate. Thus, when the fabric is clamped between the plates, the front edge of the fabric will extend slightly beyond a front edge of the plates. When the cover of the frame is installed, the front edge of the fabric will press against the cover, thus grounding the fabric against the cover, while sealing a region of the front edge against electromagnetic radiation leakage.

DETAILED DESCRIPTION OF THE PREFERRED EMBODIMENTS

Figure 1:
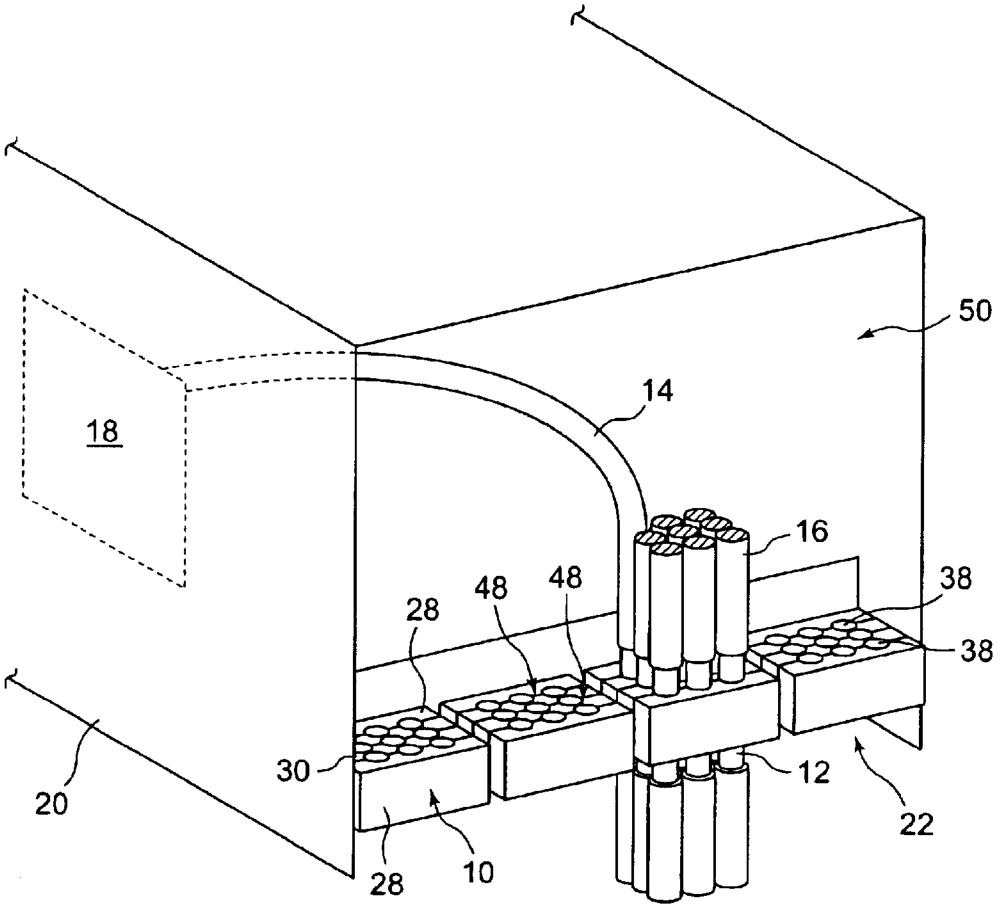
FIG. 1 is a perspective view of a cable clamp positioned within a system frame, according to an exemplary aspect of the invention.
Figure 2:
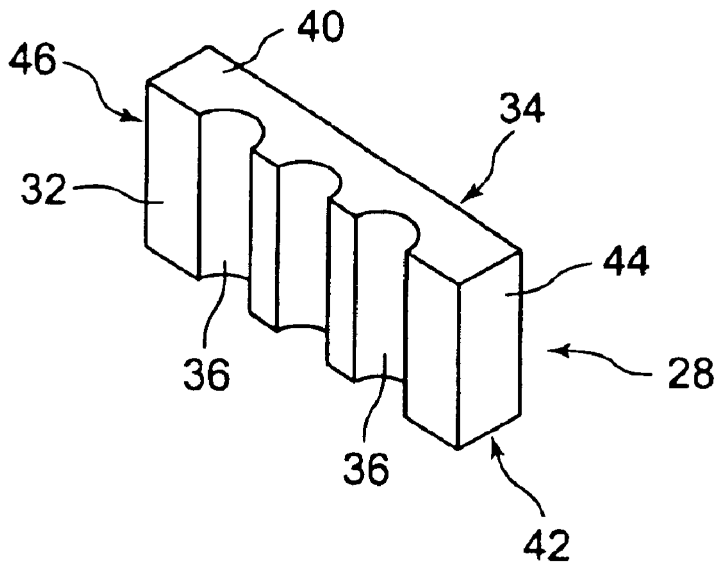
FIG. 2 is a perspective illustration of one of the plates of the cable clamp shown in FIG. 1.
Figure 3A:
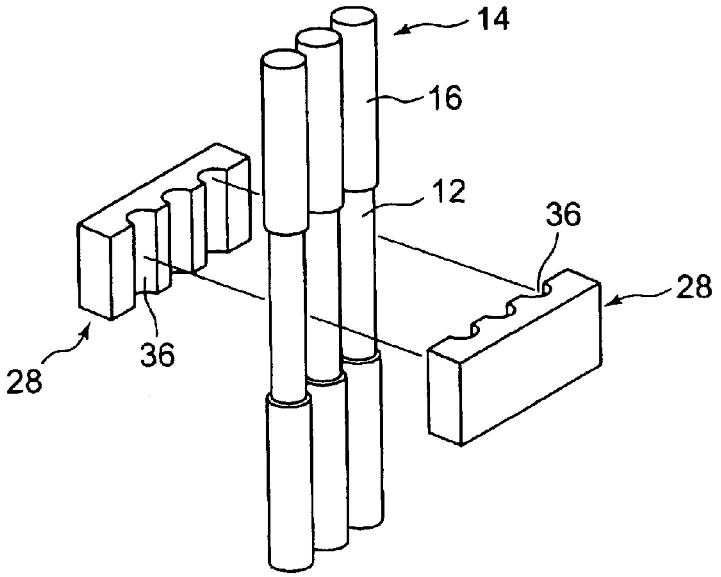
FIGS. 3A and 3B are exploded, perspective views of different aspects of the cable clamp shown in FIG. 1, and associated stripped cables.
Figure 3B:
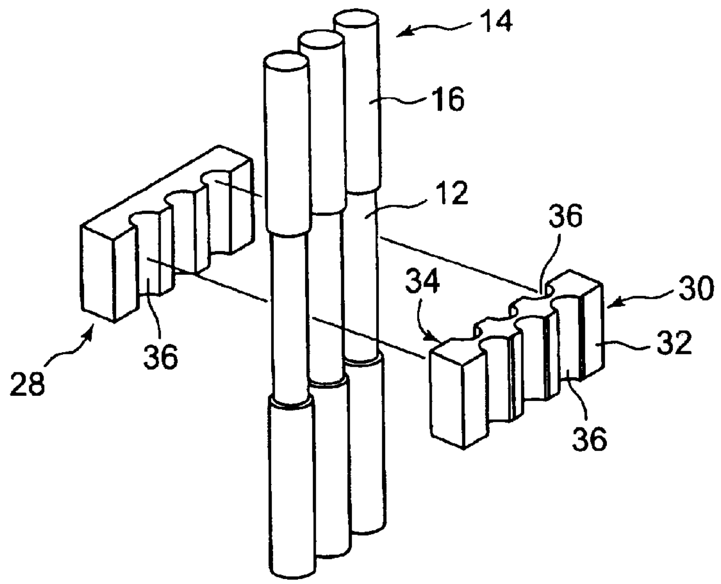

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, and if used and unless otherwise stated, the terms "upper", "lower", "front", "back", "over", "under", and similar such terms are not to be construed as limiting the invention to a particular orientation. Instead, these terms are used only on a relative basis.

Referring to FIGS. 1–4, the present invention is directed to a conductive cable clamp 10, 10' that is adapted to conductively contact a conductive shield 12 of the associated cable 14. The cable 14 has an internal conductive wire (not shown) that is surrounded by the conductive shield. An outer insulating sheathing 16 covers the conductive shield 12. Such cables are well known in the art. One end of the cable 14 is connected to an electrical component 18, such as a printed circuit board, that is disposed within a system frame 20. The cable 14 passes continuously through an opening 22 formed in the system frame 20, and has another end connected, for example, to another electrical component 24 disposed in another system frame 26 (see FIG. 4). The conductive cable clamp 10, 10' serves to fill the opening 22 that has been provided to allow passage of the cable through the frame, thereby preventing electromagnetic radiation from being emitted past the frame.

In a first exemplary aspect of the invention, the conductive cable clamp 10 includes at least a first conductive, rigid plate 28, 30 and a second conductive, rigid plate 28, 30 disposed in a superposed relationship. In this aspect of the invention, the plates are formed from metal, such as a copper alloy. However, it is also contemplated that the plates may be formed of other electrically conductive materials.

Each plate 28, 30 has opposing major surfaces 32, 34, with at least one of the major surfaces 32 having at least one semicircular groove 36 formed therein. In the illustrated exemplary aspect of the invention, the at least one major surface 32 of each plate has a plurality of the grooves 36 formed therein, with the grooves being parallel to each other. Each groove 36 extends from one edge of the plate to an opposite edge of the plate.

The plates 28,30 are positionable superposed and adjacent to each other, so that the at least one major surface 32 of one plate 28, 30 abuts against the at least one major surface of the adjacent plate 28, 30. The grooves 36 of one plate 28, 30 are then positioned to mirror the grooves 36 of the abutting plate 28, 30, so that the respective grooves collectively form a cylindrical hole or holes 38. Each hole 38 will accommodate a respective cable, as will be discussed in more detail in the paragraphs that follow. The grooves 36 may be formed in any conventional manner, for example, using milling, etching or molding techniques.

In the exemplary illustrated aspect of the invention, the plates 28, 30 are shown as being essentially rectangular, and as having four contiguous substantially flat edge faces 40, 42, 44, 46, i.e., a top edge, a bottom edge and two opposing side edges. The edge faces separate the major surfaces from each other. Moreover, one of the major surfaces 34 of at least one of the plates 28 is substantially flat, i.e., free of the grooves. In this aspect of the invention, the plates 28 serve as outermost plates of the clamp 10. This configuration allows the flat major surface 34 and side edges 44, 46 to be easily sealed against an abutting surface of the system frame 20, or against further plates, in a manner that will be more fully described in the paragraphs that follow.

Moreover, the abutting major surfaces 32, 34 of the plates 28, 30 are preferably joined together. For example, the plates 28, 30 can be fixed together using an adhesive, such as an epoxy resin, for example. Alternatively, the plates 28, 30 can be fused together, or joined using mechanical fasteners, for example.

In another exemplary aspect of the invention, the cable clamp 10 can include a plurality of superposed sub-clamps 48. For example, two superposed sub-clamps 48 can be formed using only three plates, i.e., two outermost plates 28 and an intermediate plate 30. One of the major surfaces 34 of each of the outermost plates 28 can be flat, as discussed above. Further, each major surface of the intermediate plate 30 may have at least one of the semicircular grooves 36 formed therein. In this aspect of the invention, the intermediate plate 30 will form one of the plates of a first sub-clamp 48, and will likewise form one of the plates of a second, superposed sub-clamp 48. This configuration is advantageous, since only three plates are required for forming two cable clamps; hence, less space is required. As will be appreciated, the concepts of this aspect of the invention can be expanded so that more that one intermediate plate may be provided. For example, and as shown in FIG. 1, three superposed sub-clamps 48 can be formed using only four plates, i.e., two intermediate plates 30, and two outermost plates 28.

In an exemplary aspect of the invention, a portion of the outer insulating sheathing 16 of the cable 14 is stripped from the cable, to expose the underlying conductive shield 12. The stripping can be performed using known tools and techniques, and is performed only on a portion of the cable that will be extending through the frame 20 and cable clamp 10. In a preferred aspect of the invention, the grooves 36 formed in the respective plates have a radius that is about, or slightly less than, ½ of a diameter of the stripped portion of the cable 14.

In use, the stripped portion of the respective cable 14 is placed in a respective groove 36 of one of the plates 28, 30. Another plate is then disposed over the cable 14 and the one plate, and is subsequently fastened to the one plate. As a result, the stripped portion of the cable 14 will be disposed inside of the through hole 38 formed in the resulting cable clamp 10. Moreover, if the diameter of the through hole 38 is sized to be slightly less than a diameter of the stripped portion of a respective cable 14, the cable clamp 10 will squeeze the cable. Thus, the cable clamp 10, once it is fastened to the system fame 20, will serve to securely hold the cable 14 in position. Moreover, this will ensure that the underlying conductive shield 12 of the cable will be contacted around its entire circumference by the conductive cable clamp 10, thus also ensuring that electromagnetic radiation is prevented from leaking past the stripped portion of the cable.

In a further aspect of the invention, the stripped portion of a respective cable 14 may be bonded within the respective through hole 38 using a conductive adhesive. This can help to provide a more secure connection between the cable and the sub-clamp.

In this aspect of the invention, each cable clamp 10 may be sized in length to fit within, and essentially fill, the associated opening 22 formed in the system frame 20. Alternatively, and as shown in FIG. 1, the cable clamp 10 may have a length that is substantially less than the associated opening 22 formed in the system frame. In this scenario, plural ones of the cable clamps may be placed side-by-side, until the cable clamps essentially fill the opening 22. Any remaining gaps may then be filled using a conductive gasket (not shown), for example. Such conductive gaskets are well known, such as those manufactured by Laird Technologies of Delaware Water Gap, Pa. By providing smaller, plural cable clamps, a standard-sized cable clamp could advantageously be utilized with various sized openings.

Figure 5:
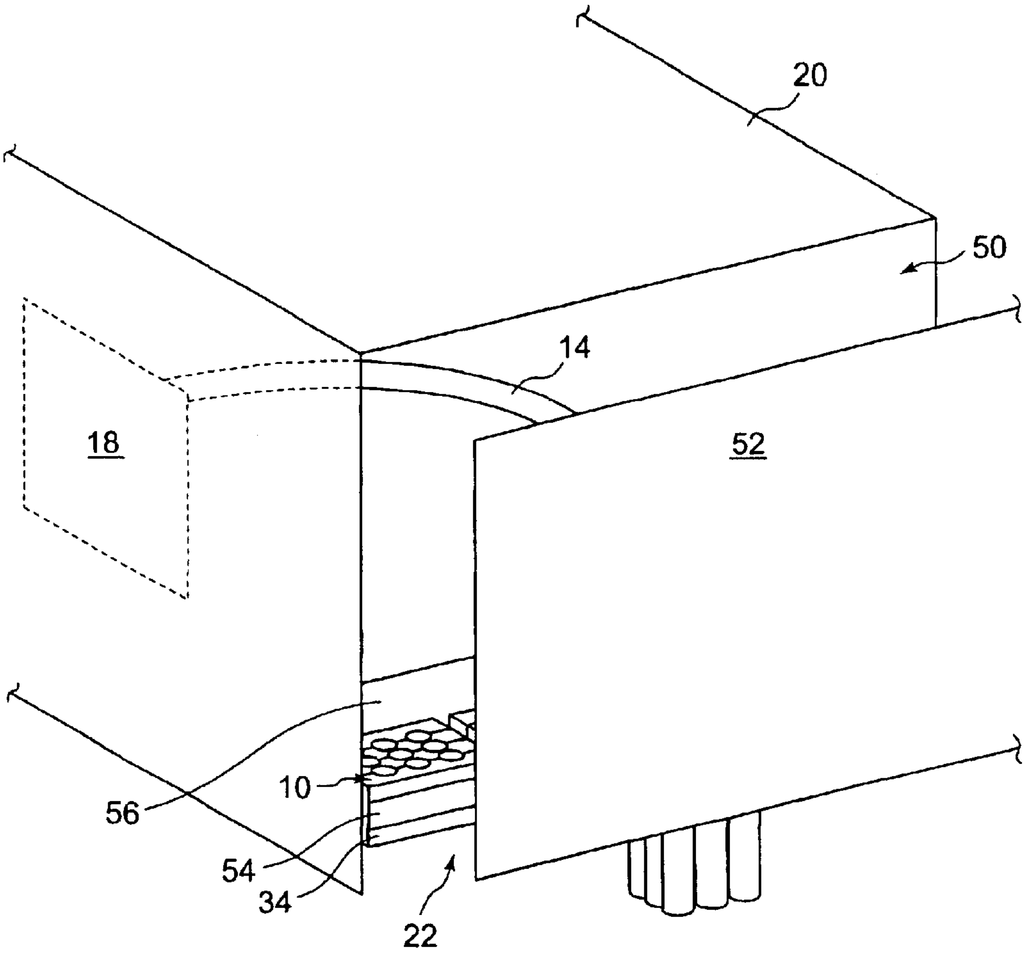
FIG. 5 is a perspective view of the cable clamp shown in FIG. 1, positioned within a system frame, together with a cover.
Figure 6:
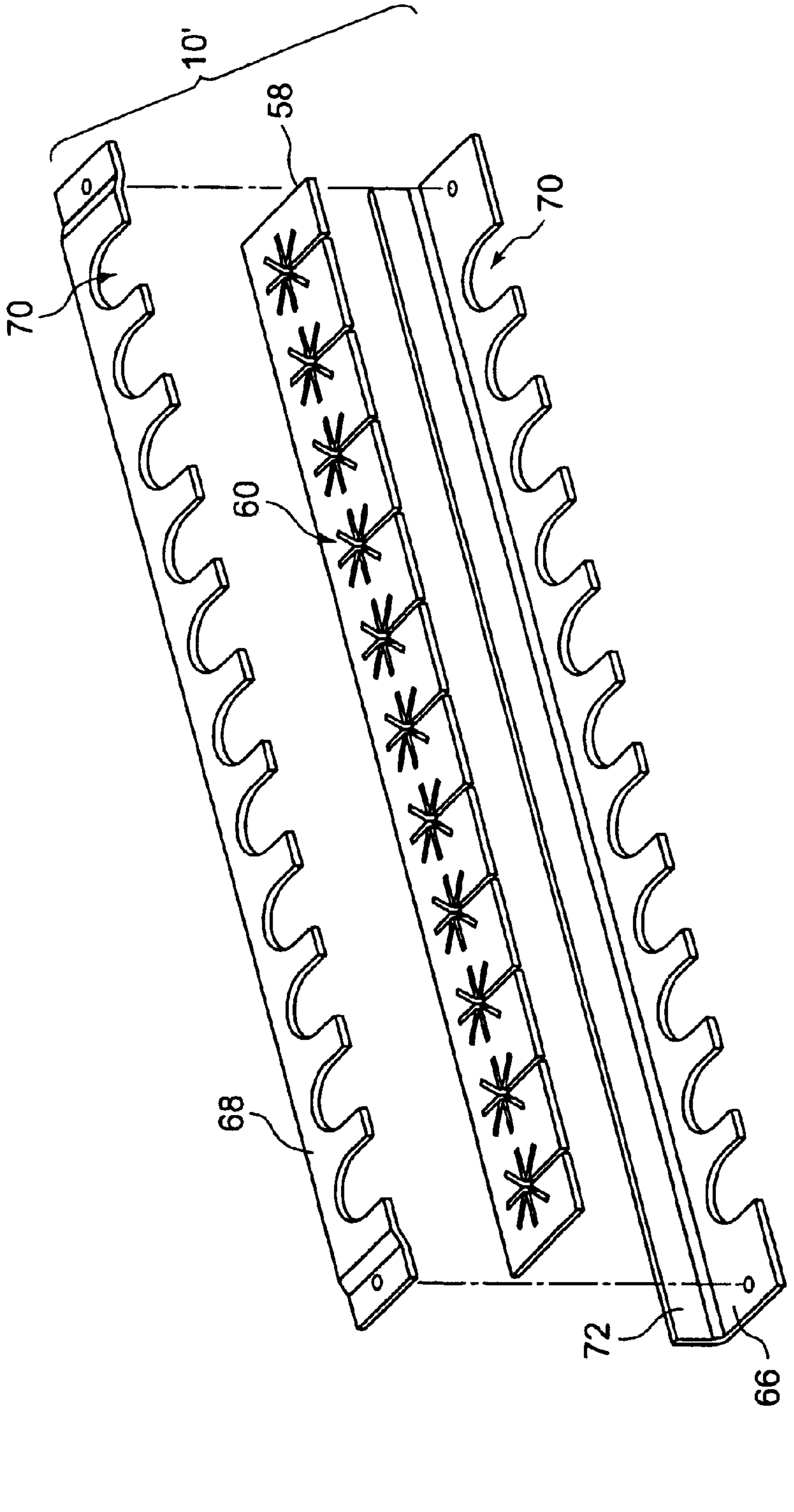
FIG. 6 is an exploded, perspective view of a cable clamp, according to another aspect of the invention.
Figure 7:
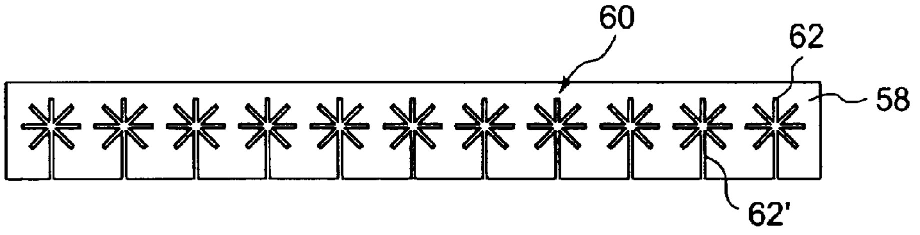
FIG. 7 is a plan view of a fabric component of the cable clamp shown in FIG. 6.
Figure 8:
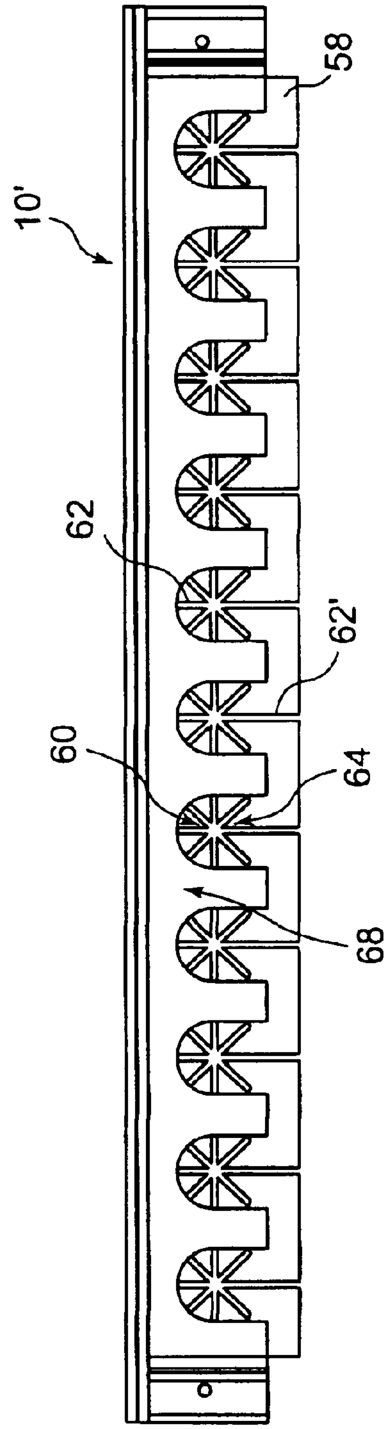
FIG. 8 is a plan view of the assembled cable clamp shown in FIG. 6.
Figure 9:
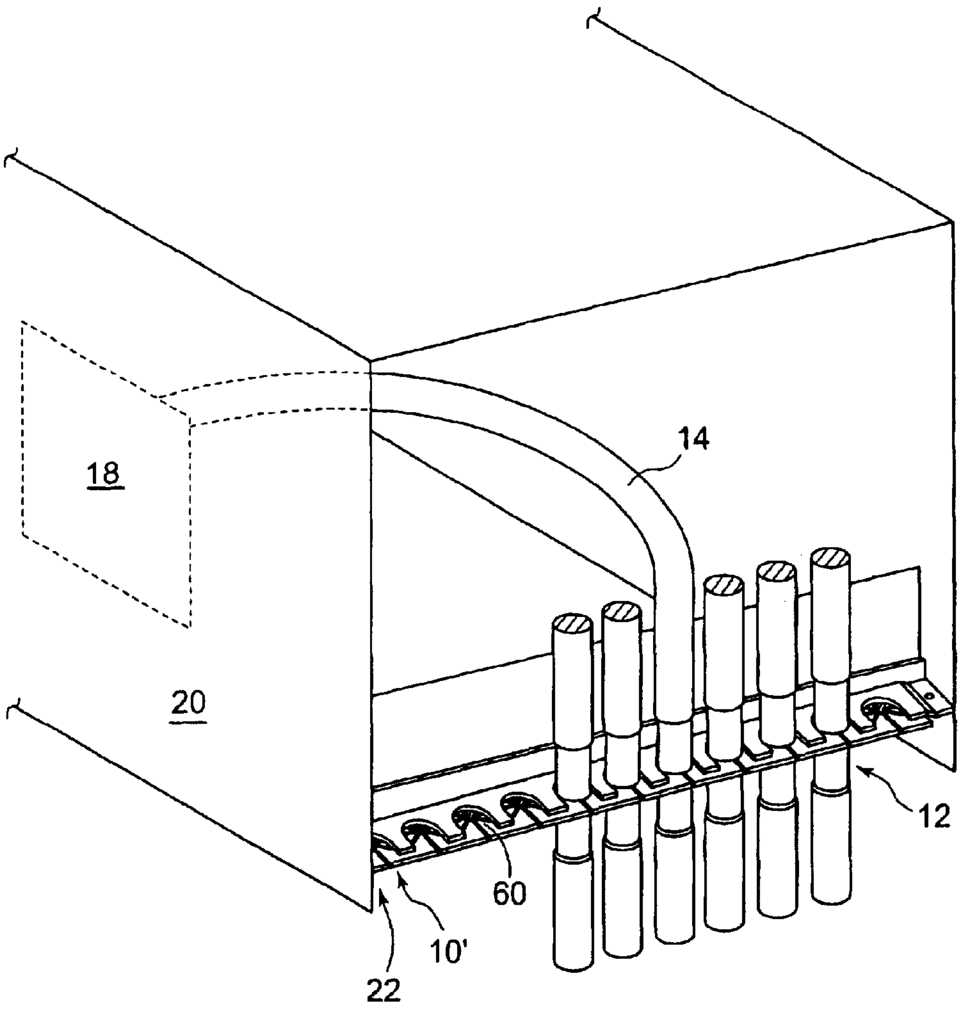
FIG. 9 is a perspective view of the cable clamp shown in FIG. 6, positioned within a system frame.

In another exemplary aspect of the invention, and referring also to FIG. 5, the system frame 20 has a parallelepiped configuration, with the opening 22 formed in the system frame being disposed at an edge of one of the walls, for example a bottom wall, of the system frame 20. The system frame 20 is also provided with a relatively large opening 50 in another adjacent wall thereof, with the large opening, and the opening 22 for accommodating the cable clamps 10, being contiguous. The large opening 50 may provide for access to the interior of the system frame 20, and may be shut using a conductive cover 52. This configuration facilitates the insertion of the cable clamps within the associated opening 22. Further, the cover 52 may abut against the outer (front) major surfaces 34 of the cable clamps 10, so that collectively, the cable clamps 10 and cover 52 essentially completely close the respective openings 22, 50, thus preventing electromagnetic radiation from passing therethrough. A conductive gasket 54 may also be provided between the cover 52 and cable clamps 10, to seal any gaps therebetween.

By way of example, the system frame may be provided with a conductive flange member 56 that extends a length of the opening 22 for accommodating the cable clamps 10, and which is disposed to be parallel to the cover 52. The flange member 56 may be recessed within the system frame 20, and is positioned away from the cover 52 by approximately a width of the cable clamps 10. The flange member 56 will provide a surface against which the cable clamps may be positioned, to seal the outer (back) major surfaces 34 of the cable clamps against electromagnetic radiation leakage.

When in place, the flat side edges 44, 46 and the flat major surfaces 34 of the cable clamps 10 will abut against a conductive surface. That is, the back major surfaces 34 of the cable clamps 10 will abut against the flange member 56, and the front major surfaces 34 of the cable clamps will abut against the cover 52. Moreover, the opposing side edges 44, 46 will either abut against the side edge of an adjacent cable clamp, or a side of the system frame 20. In this context, it is not necessary for the cable clamps 10 to actually touch the system frame or the adjacent cable clamps. Instead, the respective side edges may be separated from the system frame by a gap, which may be filled with a conductive gasket (not shown).

The cable clamps 10 may be held in place against the system frame 20 by press fitting the cable clamps into the opening 22, or by frictionally retaining the cable clamps in the opening using a conductive gasket. Alternatively, or in conjunction with the above, the cable clamps 10 can be fastened to the system frame 20 using an adhesive, using welding techniques, or by using mechanical fasteners, such as screws or auxiliary clamps (not shown).

In another exemplary aspect of the invention, and referring to FIGS. 6–9, instead of two rigid, conductive plates, the cable clamp 10' includes a conductive flexible fabric that is adhered to an underlying layer of foam (not shown), which may or may not be conductive. Such conductive fabric and foam combinations 58 are well known, such as those manufactured by Laird Technologies.

In this exemplary aspect of the invention, the conductive fabric and foam combination 58 (hereinafter referred to as simply a fabric) has one star pattern 60 formed therein for each cable 14 that is to be accommodated. In the illustrated example, the fabric 58 has eleven star patterns 60; however, there can be more or less star patterns if desired. Further, although the star patterns 60 are shown as being disposed in a single row, it is also contemplated that the star patterns may be disposed in multiple, offset rows, if desired.

As shown, each star pattern 60 is formed of a plurality of slits 62, each of which extends radially outward from a center of the star pattern. The slits 62 form a plurality of triangular flexible flaps 64, with one flap being disposed between two adjacent slits, and with the apexes of the flaps terminating at the center of the star pattern. In the illustrated example, each star pattern 60 has eight, evenly spaced slits 62, and a like number of flaps 64.

In use, the stripped portion of a respective cable 14 is placed in one of the star patterns 60. The cable 14 will cause the flaps 64 to flex outwardly, and to lie on the underlying conductive shield 12 of the cable. Since the fabric 58 is conductive, the underlying conductive shield 12 will be grounded to the system frame 20 via the fabric. Moreover, the plurality of flaps 64 will substantially surround the stripped portion of the cable 14, so that most of the outer circumference of the stripped portion will be in contact with a respective flap. Although there may be small openings between adjacent ones of the flaps 64, it is not believed that these small openings will allow for the passing of unacceptable electromagnetic radiation. However, these small gaps may be subsequently sealed, using a conductive adhesive, if desired. Alternatively, two superposed fabrics may be provided, each having star patterns formed therein, with the star patterns of one fabric being disposed directly over the star patterns of the other fabric. In this scenario, the flaps of the star patterns of the underlying fabric may be offset to the flaps of the star patterns of the overlying fabric to minimize any such gaps.

As shown, most of the slits 62 of any one star pattern 60 terminate a short distance away from the center of the star pattern. However, in a further aspect of the invention, one of the slits 62' of each star pattern 60 may be longer than the other slits, and extends to the edge of the fabric 58. This configuration will allow a cable 14 to be easily inserted into, and removed from, the fabric, as desired, by way of the long slit 62'.

In order to provide sufficient rigidity to the fabric, the cable clamp 10' may include two rigid conductive plates 66, 68, one of which is disposed over the fabric 58, and the other of which is disposed below the fabric. As shown, each plate 66, 68 has semicircular recesses 70 formed along one of its respective edges. Each recess 70 is positioned to correspond to a respective star pattern 60. When assembled, the long slit 62' of each star pattern 60 will be positioned approximately central to the corresponding recess 70. The recesses 70 thus allow the star patterns 60 to be accessed by the cable 14.

As shown, one of the plates 66 may have a rear flange 72, which serves as a positioning member for the other plate 68 and the fabric 58. That is, a rear edge of the other, flangeless plate 68 will abut against the flange 72 when properly positioned, thus ensuring that the semicircular recesses 70 in both plates will be aligned relative to each other, from a front-to-back direction of the plates. Similarly, the rear edge of the fabric 58 will also abut against the flange 72 when properly positioned, thus ensuring that the star patterns 60 are aligned relative to the semicircular recesses 70 in the plates, from a front-to-back direction of the plates.

The plates 66, 68 may be connected together in a variety of known manners. For example, the ends of the plates may be riveted together. When the plates 66, 68 are connected together, the fabric 58 will be securely clamped between the plates, ensuring the fabric will not move from between the plates.

In a further aspect of the invention, the fabric 58 has a width, as measured from the front-to-back direction, which is greater than a width of the flangeless plate 68. Thus, when the fabric 58 is clamped between the plates 66, 68, the front edge of the fabric will extend slightly beyond a front edge of the plates. When the cover 52 is installed, the front edge of the fabric 58 will press against the cover, thus grounding the fabric against the cover, while sealing a region of the front edge against electromagnetic radiation leakage. This aspect of the invention advantageously eliminates any need for a separate gasket to be located between the clamp and the cover.

The cable clamp 10' preferably has a length that corresponds to a length of the opening 22; however, it is also contemplated that the length of the cable clamp may be less than the length of the opening, with any resulting gaps being filled with a conductive gasket. Moreover, the cable clamp 10' is positioned in the opening 22 of the system frame 20 in a manner similar to that described in connection with the other exemplary embodiment.

Figure 4:
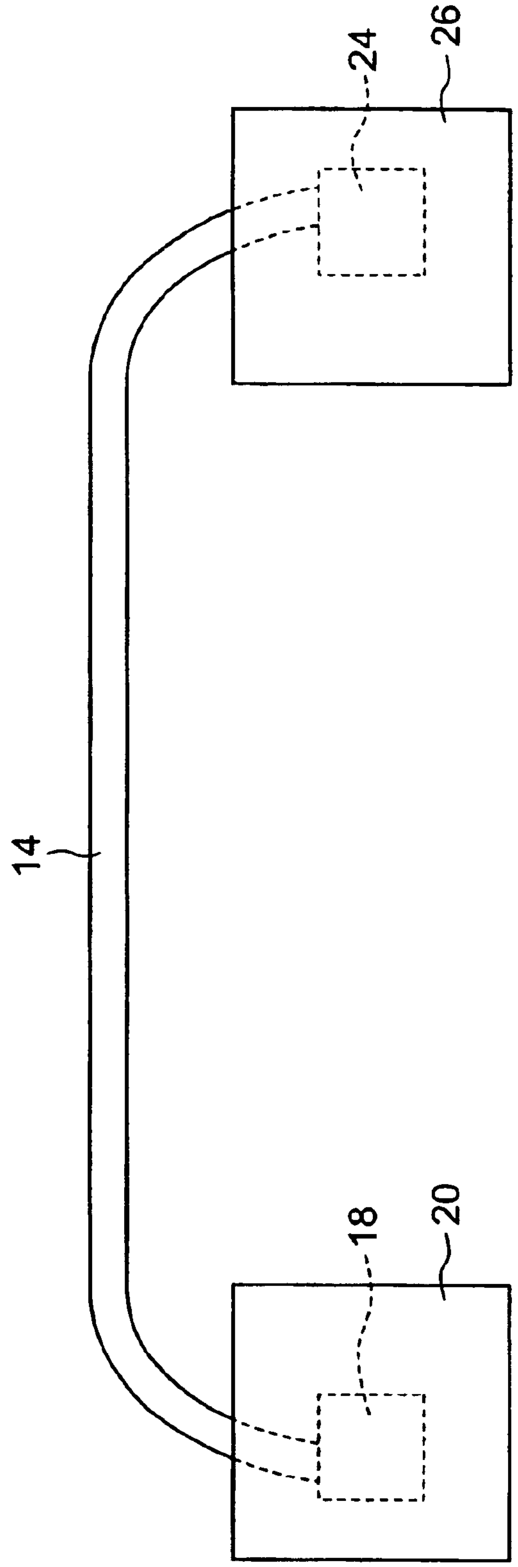
FIG. 4 shows two interconnected subsystems, in accordance with the present invention.

Referring briefly back to FIG. 4, the concepts of the present invention may be utilized to allow an electrical component 18 disposed within the frame 20 of a first sub-system, to be electrically coupled with the electrical component 24 disposed within the frame 26 of a second sub-system, using only a single, continuous cable 14. Moreover, the present invention allows an electromagnetic radiation boundary of each subsystem to be independently maintained.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. A device used in connection with at least one cable having a conductive shield, comprising:

a conductive cable clamp adapted to clamp a periphery of the cable while conductively engaging the conductive shield of the cable, said cable clamp preventing electromagnetic radiation from passing by the periphery of the cable, said cable clamp including a conductive flexible fabric having at least one pattern formed therein, the pattern accommodating the cable therein, the pattern being a star-shaped pattern formed in said fabric, the pattern including a plurality of evenly spaced slits radially extending outward from a center of the pattern, and wherein every two adjacent slits form a triangular flap.

2. The device recited in claim 1, wherein one of the slits extends to an edge of said fabric, to allow the cable to be inserted into the center of the pattern.

3. The device recited in claim 1, wherein a plurality of the star-shaped patterns are formed in the fabric, and arranged in a row.

4. The device recited in claim 1, wherein said fabric is adhered over a layer of foam.

5. The device recited in claim 1, wherein said cable clamp includes an upper and a lower rigid conductive plate, said conductive flexible fabric being clamped between said upper and lower plates.

6. The device recited in claim 5, wherein said upper plate has a semicircular recess formed at an edge thereof, and said lower plate has a semicircular recess formed at an edge thereof, the recesses being disposed in alignment to each other and positioned to correspond to a position of, so as to expose, the star-shaped pattern.

7. The device recited in claim 6, wherein one of said plates has a rear flange, a rear edge of another one of said plates and a rear edge of said fabric abutting against the rear flange to position said plates and said fabric relative to each other.

8. The devices recited in claim 7, wherein a front edge of said fabric extends past a front edge of said upper plate and a front edge of said lower plate, when the rear edge of the another one of said plates and the rear edge of said fabric abut against the rear flange.

9. An electronic system, comprising:

at least one electronic subsystem having an electrically conductive system frame and an electrical component disposed inside of said system frame, said system frame having an opening therein;

at least one cable electrically coupled to said electrical component, and extending outside of said system frame via the opening, said cable having a signal wire, and a conductive shield surrounding the signal wire;

a conductive cable clamp disposed in the opening and being electrically coupled to said system frame, said cable clamp being adapted to clamp and conductively engage a periphery of the conductive shield, said cable clamp preventing electromagnetic radiation from passing through the opening by the periphery of said cable; and a conductive adhesive bonding said cable in the cable clamp.

10. The electronic system recited in claim 9, wherein said cable clamp includes a first conductive plate and a second conductive plate, each of said plates having at least one groove formed therein, said first plate being positionable against said second plate so that the groove in said first plate and the groove in said second plate collectively form a hole extending from one edge of said cable clamp to an opposite edge of said cable clamp, the hole accommodating said cable therein.

11. The electronic system recited in claim 9, wherein said at least one cable includes a plurality of cables, wherein said cable clamp includes first and second outermost conductive plates and an intermediate plate disposed between said outermost plates, each of said outermost plates having an inside major surface having a groove formed therein, said intermediate plate having opposing first and second major surfaces each of which has a groove formed therein, wherein said first outermost plate is positionable against the first major surface of said intermediate plate so that the groove in said first outermost plate and the groove in the first major surfaces of said intermediate plate collectively form a hole extending from one edge of said cable clamp to an opposite edge of said cable clamp, the hole accommodating one of said cables therein; and wherein said second outermost plate is positionable against the second major surface of said intermediate plate so that the groove in said second outermost plate and the groove in the second major surface of said intermediate plate collectively form a further hole extending from the one edge of said cable clamp to the opposite edge of said cable clamp, the further hole accommodating another one of said cables therein.

12. The electronic system recited in claim 9, wherein said at least one cable includes a plurality of cables, wherein said cable clamp includes first and second outermost conductive plates and a plurality of intermediate plates disposed between said outermost plates, each of said outermost plates having an inside major surface having a groove formed therein, each of said intermediate plates having opposing first and second major surfaces each of which has a groove formed therein, wherein said first outermost plate is positionable against the first major surface of one of said intermediate plates so that the groove in said first outermost plate and the groove in the first major surfaces of said one of said intermediate plates collectively form a hole extending from one edge of said cable clamp to an opposite edge of said cable clamp, the hole accommodating one of said cables therein; and wherein said second outermost plate is positionable against the second major surface of another one of said intermediate plates so that the groove in said second outermost plate and the groove in the second major surface of said another one of said intermediate plates collectively form a further hole extending from the one edge of said cable clamp to the opposite edge of said cable clamp, the further hole accommodating another one of said cables therein.

13. The electronic system recited in claim 9, wherein said cable clamp includes a conductive flexible fabric having at least one pattern formed therein, the pattern accommodating said cable therein.

14. The electronic system recited in claim 13, wherein the pattern is a star-shaped pattern formed in said fabric, the pattern including a plurality of evenly spaced slits radially extending outward from a center of the pattern, and wherein every two adjacent slits form a triangular flap.

15. The electronic system recited in claim 14, wherein one of the slits extends to an edge of said fabric, to allow the cable to be inserted into the center of the pattern.

16. The electronic system recited in claim 14, wherein said at least one cable comprises a plurality of said cables; and wherein a plurality of the star-shaped patterns are formed in the fabric, and arranged in a row.

17. The electronic system recited in claim 14, wherein said cable clamp includes an upper and a lower rigid conductive plate, said conductive flexible fabric being clamped between said upper and lower plates.

18. The electronic system recited in claim 17, wherein said upper plate has a semicircular recess formed at an edge thereof, and said lower plate has a semicircular recess formed at an edge thereof, the recesses being disposed in alignment to each other and positioned to correspond to a position of, so as to expose, the star-shaped pattern.

19. The electronic system recited in claim 18, wherein one of said plates has a rear flange, a rear edge of another one of said plates and a rear edge of said fabric abutting against the rear flange to position the plates and the fabric relative to each other; and wherein a front edge of said fabric extends past a front edge of said upper plate and a front edge of said lower plate, when the rear edge of the another one of said plates and the rear edge of said fabric abut against the rear flange.

20. The electronic system recited in claim 19, wherein the opening in said system frame comprises a first opening, and said system frame further includes a second opening that is contiguous with the first opening, the second opening providing access into said system frame; further comprising a conductive cover positionable to cover the second opening;

and wherein a front edge of said fabric extends past a front edge of said upper plate and a front edge of said lower plate, when the rear edge of the another one of said plates and the rear edge of said fabric abuts against the rear flange, said cover abutting against the front edge of said fabric so that said cover and said cable clamp collectively close both the first opening and the second opening.

21. The electronic system recited in claim 13, wherein when the cable is accommodated in the star-shaped pattern, the cable causes the triangular flap to flex outwardly and to lie on the conductive shield, so that the conductive shield is conductively coupled with the conductive fabric via the triangular flap.

22. The device recited in claim 1, wherein when the cable is accommodated in the star-shaped pattern, the cable causes the triangular flap to flex outwardly and to lie on the conductive shield, so that the conductive shield is conductively coupled with the conductive fabric via the triangular flap.

23. A method of electrically coupling a first electrical component disposed in a first subsystem with a second electrical component disposed in a second subsystem, while maintaining separate electromagnetic radiation boundaries of the first subsystem and the second subsystem, comprising:

providing a first electronic subsystem having a first electrically conductive system frame and a first electrical component disposed inside of the first system frame, the first system frame having an opening therein;

providing a second electrical subsystem having an second electrically conductive system frame and a second electrical component disposed inside of the second system frame, the second system frame having an opening therein;

electrically coupling the first electrical component to the second electrical component using a signal wire of a common cable, the cable passing through the opening in the first system frame and the opening in the second system frame, the cable having a conductive shield surrounding the signal wire;

exposing the conductive shield in a first region where the cable passes through the opening in the first system frame and in a second region where the cable passes through the opening in the second system frame;

disposing a first conductive cable clamp in the opening in the first system frame and disposing a second conductive cable clamp in the opening in the second system frame;

electrically coupling the first cable clamp to the first system frame, and electrically coupling the second cable clamp to the second system frame; and clamping the first region with the first cable clamp so that the first cable clamp conductively engages the conductive shield, and clamping the second region with the second cable clamp so that the second cable clamp conductively engages the conductive shield, thereby preventing electromagnetic radiation from passing through the first opening and the second opening;

wherein each cable clamp includes a conductive flexible fabric having at least one pattern formed therein, the pattern accommodating the cable therein; and wherein the pattern is a star-shaped pattern formed in the fabric, the pattern including a plurality of evenly spaced slits radially extending outward from a center of the pattern, and wherein every two adjacent slits forms a triangular flap.

24. The method recited in claim 23, wherein each cable clamp includes an upper and a lower rigid conductive plate, the conductive flexible fabric being clamped between the upper and lower plates.

25. The method recited in claim 23, wherein when the cable is accommodated in the star-shaped pattern, the cable causes the triangular flap to flex outwardly and to lie on the conductive shield, so that the conductive shield is conductively coupled with the conductive fabric via the triangular flap.

* * * * *